Nov. 29, 1966  E. LAIMINS ETAL  3,289,134
GAGED DIAPHRAGM PRESSURE TRANSDUCER
Filed April 24, 1964  2 Sheets-Sheet 1
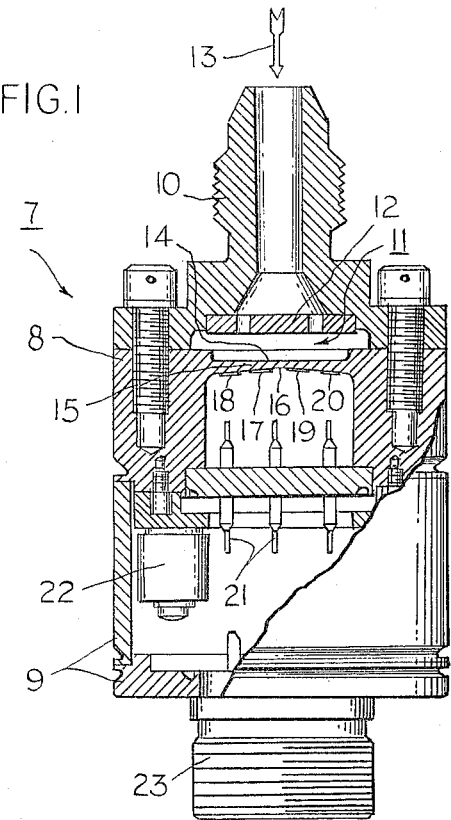
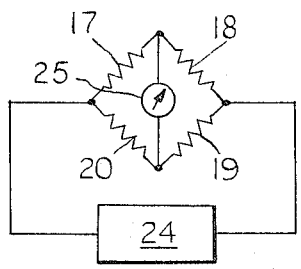
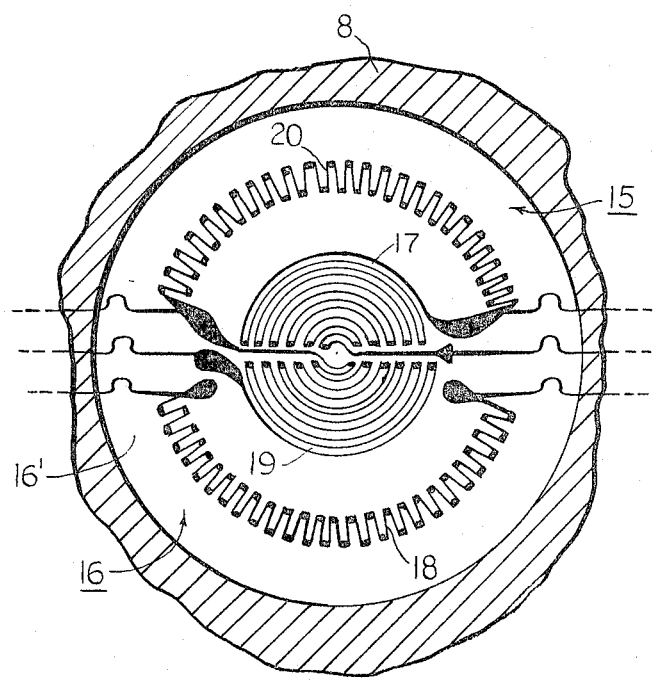
INVENTORS:
ERIC LAIMINS
ANTHONY H. BRACKETT JR
BY,
Dike, Thompson, Bronstein & Mrose
ATTORNEYS Nov. 29, 1966   E. LAIMINS ETAL   3,289,134
GAGED DIAPHRAGM PRESSURE TRANSDUCER
Filed April 24, 1964   2 Sheets-Sheet 2
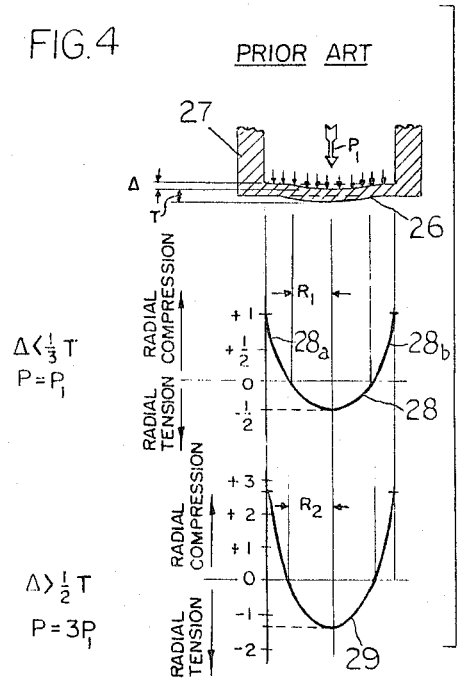
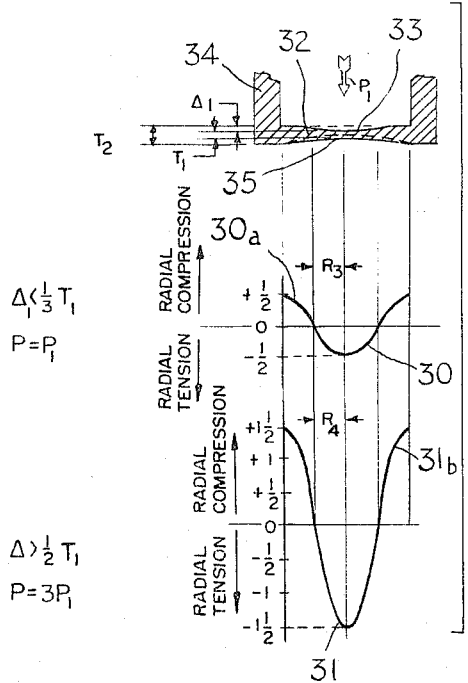
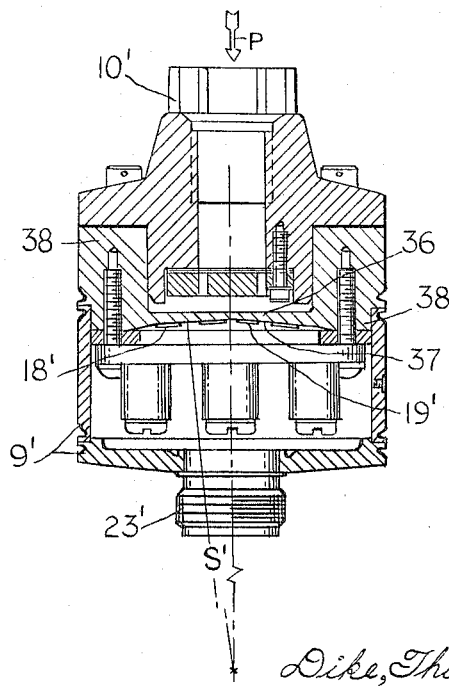
INVENTORS
ERIC LAIMINS
ANTHONY H. BRACKETT JR
BY,
Dike, Thompson, Bronstein & Mros
ATTORNEYS United States Patent Office 3,289,134
Patented Nov. 29, 1966

3,289,134
GAGED DIAPHRAGM PRESSURE TRANSDUCER
Eric Laimins and Anthony H. Brackett, Jr., both of Cambridge, Mass., assignors to BLH Electronics, Inc., Waltham, Mass., a corporation of Delaware
Filed Apr. 24, 1964, Ser. No. 362,267
7 Claims. (Cl. 338—4)

The present invention relates to improvements of measurements which are responsive to flexure strains in relatively stiff diaphragms and, in one particular aspect, to novel and improved diaphragm-type pressure transducers having unique diaphragm configurations which advantageously promote linearity of output signals developed by strain gage sensors.

It is of course well known in the art to measure elastic strains resulting from deformations of a circular diaphragm which is clamped or otherwise held fixed about its periphery, and to interpret such measurements in terms of the differentials of pressures acting on the faces of the diaphragm. Generally, such diaphragms have been made of uniform-thickness material and have been designed to remain substantially flat in the unloaded state, although the art has also included corrugated and other "formed" diaphragms in which not all of the diaphragm material lies in essentially one plane. Electrical resistance strain gages have proved to be highly useful in the accurate sensing of the diaphragm strains.

Modern requirements for heightened measurement accuracy have not been fully satisfied by the existing forms of gaged diaphragm transducers, and it is found that one of the major difficulties in this regard stems from non-linearities in their response characteristics. By way of example, one popular type of gaged diaphragm pressure transducer construction has involved electrical resistance strain gages responding to radial strains of both tension and compression occurring simultaneously at inner and outer positions along one face of a flat diaphragm, and, unfortunately, the measured strains in tension and compression not only prove to be non-linear and different from one another but also to vary in non-proportional fashion with changes in the applied pressures. Maximum radial strain near the outer periphery proves to be about twice that near the center of the diaphragm, such that, for a given electrical output, the factor of safety of the device is determined by the existence of a strain larger than that needed for pressure-measuring purposes, and the transducer design is thus not one of optimum efficiency. Maximum output and linearity instead call for tension and compression strains which are of about equal magnitude throughout an operating range; this is especially true of devices utilizing semiconductor strain gages. Another difficulty with prior gaged diaphragm transducers has resulted from the very sharp gradients of radial strain exhibited near the diaphragm periphery, such that very slight deviations in the locations of strain gages near the periphery will cause large variations, and errors, in electrical outputs; this fact renders the placements of peripheral gages highly critical, particularly when it is attempted to miniaturize such transducers.

In accordance with the present teachings, the gaged diaphragm of a transducer is so proportioned that its central and peripheral radial strains, in tension and compression, are of about the same magnitude over a wide range of variations, and, moreover the peripheral gradients of strain in compression are desirably low over a substantial annular expanse. These characteristics are achieved economically and simply, by proportioning the diaphragm such that its transverse cross-section, taken along a diameter thereof, has the form of a flat-topped arch. Preferably, the arched side of the diaphragm has the configuration of a substantially spherical segment, and extends radially at least the same distance as the opposite flat surface of the diaphragm.

It is one of the objects of the present invention, therefore, to provide novel and improved gaged diaphragm transducers of economical and uncomplicated construction which exhibit highly linearized output characteristics over wide operating ranges.

Another object is to provide a unique pressure transducer having strain gages associated with a diaphragm which in transverse cross-section has the form of a flat-topped arch, and which has a relatively low gradient of radial strain near the periphery thereof.

A further object is to provide a gaged diaphragm pressure transducer in which one surface of the diaphragm is substantially flat and the other curved, to yield diaphragm thicknesses which increase progressively and continuously from the center to the outer periphery and, thereby, to render the radial tension and compression strains occurring on one surface of the diaphragm substantially equal.

By way of a summary account of practice of this invention in one of its aspects, a relatively stiff, and yet elastic, metal diaphragm is formed as the integral end closure of a cup-shaped element which is intended to have fluid pressures applied to its interior. The inner surface of the diaphragm is formed substantially flat, and the opposite surface is concave, preferably substantially spherical in contour, over at least the same radial span. Strain gages, such as those of the bonded resistance type, respond to the strains exhibited near the center and periphery, respectively, at the concave surface of the diaphragm as the pressure acting on the flat face of the diaphragm increases. Sensed strains in compression (near the periphery) and tension (near the center) are found to be substantially equal across a relatively broad range of diaphragm deflections and applied pressures, such that bridge measurements which are responsive to the sensed strains of opposite character tend to be linearly related to the applied pressures.

Although the features of this invention which are considered to be novel are set forth in the appended claims, further details as to preferred practices of this invention, as well as the further objects and advantages thereof, may be most readily comprehended through reference to the following description taken in connection with the accompanying drawings, wherein:

FIGURE 1 depicts a partly cross-sectioned main assembly of an improved pressure transducer in which the present teachings are expressed;

FIGURE 2 is an elementary electrical measurement network incorporating the strain gage units of the transducer portrayed in FIGURE 1;

FIGURE 3 shows, in enlargement, the insulated spherically-contoured under surface of the diaphragm of the transducer of FIGURE 1, together with affixed printed-circuit resistance strain gage elements;

FIGURE 4 illustrates a prior art flat diaphragm construction, in association with two curves characterizing the strains existing at the lower diaphragm surface under different pressure conditions;

FIGURE 5 illustrates an improved flat top arch diaphragm in association with two curves characterizing the strains existing at the lower curved diaphragm surface under different pressure conditions; and FIGURE 6 depicts a partly cross-sectioned main assembly of another form of improved pressure transducer.

The pressure transducer assembly 7 appearing in FIGURE 1 includes a generally cylindrical casing having two joined sections, 8 and 9, which enclose pressure-responsive and electrical components of the transducer. At one end, a pressure-tight coupling 10 admits pressurized fluid to a cavity 11 through a diffuser 12, from a site where the pressure conditions are to be sampled. The applied pressure, suggested by arrow 13, acts upon the flat top surface 14 of an elastic metal diaphragm 15 which has a concaved arched lower surface 16, thereby causing the diaphragm to be depressed downwardly while its outermost periphery is fixedly held against movement by the rigid hollow cylindrical casing section 8 of which it is an integral part. Bonded to the lower concave diaphragm surface 16 are four electrical resistance strain gage elements 17–20, of which elements 17 and 19 are disposed radially nearer the center of the diaphragm, and elements 18 and 20 are disposed radially nearer the periphery. This physical arrangement of the gage elements, which is not novel per se, insures that those innermore will respond to strains of tension and those outermore will respond to strains of compression exhibited by the lower diaphragm under conditions of downward deflection. Electrical connector pins 21 couple the gage elements with other elements, such as auxiliary resistance 22, and with an external multi-terminal electrical connector 23 fastened to the casing section 9.

In FIGURE 2, a common type of measurement network which is useful with gaged pressure transducers is shown to incorporate the pairs of inner and outer strain gages in opposite arms of a bridge. Supply 24, which may comprise a battery, applies excitation to the bridge input terminals, and an indicating instrument 25, such as a sensitive current-measuring instrument, develops output indications related to the measured strains, and, hence, the applied pressures. Modules gages and other circuit elements may also be included in the network, in accordance with known practices. As shown in FIGURE 3, strain gage resistance elements, such as elements 17–20, may conveniently be of bonded foil rather than fine wire types; these may be installed as a unit and may each have a large arcuate expanse promoting a maximum response to surface strains. In such a construction, the curved surface is electrically isolated from the bonded foil conductors by a thin insulating layer 16′ of Bakelite or the like. The effects of circumferential central stresses on gaging elements 18 and 20 (which are about the same as the radial stresses near the center), and radial tension on gaging elements 17 and 19, induce resistance changes which together tend to unbalance the bridge by maximum amounts, and thereby develop maximum measurement sensitivities. However, unless these respective pairs of gaging elements change their resistances by equal increments for each incremental change in differential pressure experienced by the diaphragm, the resultant output signals from the bridge will not be linearly related to the applied pressure differentials. Uniform-thickness diaphragms which have been widely used heretofore are found to induce such non-linearities, particularly as they experience large deformations while witnessing large pressure differentials. Relatively thin diaphragms, whose thicknesses are relatively small in relation to their diameters, exhibit the greater non-linearities and are thus unable to provide highly accurate sensitive measurements over broad ranges.

The portrayals in FIGURE 4 characterize the aforesaid non-linear behavior of thin normally-flat diaphragms, such as the illustrated circular diaphragm 26 which is of a uniform thickness T and which is restrained about its periphery by an integral hollow cylindrical support 27. Applied pressure $P_1$ occasions the illustrated downward flexure of the diaphragm and, so long as the deflection $\Delta$ of the center is not in excess of about one-third T, the radial strain pattern is as shown by curve 28. The strains near the center and periphery are there of different magnitudes, and of opposite sense. The strain gradients in regions 28a and 28b, corresponding to positions near the periphery of the diaphragm are very sharp and it is thus evident that the locations of gages at these positions are quite critically related to optimum operation of a pressure transducer. When the diaphragm deflection $\Delta$ exceeds more than about one-half T, the relationships between radial strains in tension near the center and compression near the periphery assume different proportions relative to one another, as indicated by curve 29. For the conditions characterized by curve 29, when the pressure is increased to $3P_1$, the maximum peripheral strains prove to be less than three times those experienced with pressure $P_1$, while the maximum central strains is also short of three times the former strains, though to a lesser extent, and the two sets of sensing gages will therefore yield a bridge measurement which is no longer linearly related to the applied pressure. It is discovered, as before, that the strain gradients near the periphery of the diaphragm are very sharp, and, moreover, the positions of inflection of the radial strains are seen to be moved radially outward (i.e. $R_2$ is greater than $R_1$), with the increasing diaphragm deflections. In practice, non-linearities exceeding 3% have been found at a maximum strain level of 2,000 microinches per inch, with a diaphragm thicknesses of 0.015 inch, for example.

For purposes of comparison, the conditions characterized by curves 30 and 31 in FIGURE 5 are likewise for applied pressures $P_1$ and $3P_1$, respectively, and for diaphragm center deflections, $\Delta_1$, which are respectively less than one-third and more than one-half of the central thickness $T_1$ of an improved form of diaphragm, 32. Circular diaphragm 32 has a top surface 33 which is normally flat except when downwardly flexed in relation to its integral peripheral rim support 34 by applied fluid pressure $P_1$, and it further has a lower concave surface 35 machined to a substantially spherical form along a radius of curvature, S (not shown in the drawings), which has its center aligned with a line perpendicular to flat top surface 33 at its center. The undeflected configuration of diaphragm 32 is shown by dashed linework in FIGURE 5. Thickness $T_1$ of the center of the diaphragm is thus less than the diaphragm thickness $T_2$ at its outer periphery, the variation in thickness being determined by the spherical radius S. The ratio $S/T_1$ is important inasmuch as it determines the strain distribution in the diaphragm and the linearity of the pressure-strain relationship. An optimum range for the ratio $S/T_1$, which is particularly advantageous with diaphragms of about one inch diameter, is between about 100 and 600. Specific examples of S and $T_1$ parameters which have been found useful with improved pressure transducers having the unique diaphragms with a diameter of 0.94 inch are as follows:

| Rated Transducer Capacity, p.s.i. | $T_1$, inch | S, inch | Associated Bridge Output, mv. per volt input |
|---|---|---|---|
| 500 | 0.022 | 7¼ | 3 |
| 1,000 | 0.034 | 6 | 3 |
| 2,000 | 0.050 | 5¼ | 3 |

In its flat-topped arch configuration, the diaphragm 32, and the like diaphragm 15 (FIGURE 1), is found to exhibit a maximum compressive radial strain near its outer periphery which is about equal to the maximum tensile radial strain near the center of the diaphragm. Curves 30 and 31 verify this for the conditions where $\Delta$ is less than one-third $T_1$ and more than one-half $T_1$, it being noted that both maximum and minimum stresses of opposite sense are substantially the same at both sites even under the latter more extreme conditions. Optimum ratios of $S/T_1$ may be determined either empirically or by calculation. An additional important result is that the gradients in radial strain near the periphery of the diaphragm, as designated by reference characters 30a and 31b in FIGURE 5, are significantly lower than in the case of a thin flat diaphragm (FIGURE 4) and, in some instances may be made nearly constant. This renders the placements of strain gages less critical, and is particularly advantageous in the fabrication of miniaturized transducers having small diaphragms. Proper choice of profile of the concave lower surface insures that the points of inflection of the radial strains remain at about the same radial location throughout a wide range of operation (i.e. $R_3$ is about equal to $R_4$ in FIGURE 5).

Measurement linearity is significantly improved as a consequence of the equalities preserved in peripheral and central radial strains. It is believed that the superior performance of the flat-topped arch construction may result from a combination of arch action and unique membrane effects in the diaphragm. Improvement in the linearity which can be realized in accordance with these teachings may be noted by comparing the 0.05–0.25% deviations now obtainable with regular production items, and the 0.5–1% or more deviations from linearity of prior optimum devices. These differences in percentages, while small in absolute value, are highly significant and represent an important advance in the reduction of error previously thought to be at an irreducible minimum for this general type of device.

Another improved transducer construction which well lends itself to fabrication of its arched diaphragm element is protrayed in FIGURE 6. The flat-topped diaphragm 36 there has its concave lower surface 37 at nearly the same level as the lower edges of the integral hollow cylindrical rim 38, such that the spherical radius S′ may be readily machined. Other components of the assembly, which are functionally the same as components of the transducer appearing in FIGURE 1, are identified by the same reference characters with distinguishing single-prime accents added.

Although the spherical configuration of the concave diaphragm surface is preferred, as particularly well lending itself to precision machining, the concavity may deviate somewhat from the spherical form without losing advantages which have here been described. The principal criteria are that the configuration and thicknesses selected should produce low gradients of radial strain near the periphery, and that the radial strain at the periphery be about equal to the co-existing strain (radial or circumferential) near the middle of the diaphragm. For these purposes, both oppositely-disposed surfaces of a diaphragm may be curved; this construction has the advantage that shear stresses near the periphery are reduced and relatively high pressures can be more readily withstood (for example, 50,000 p.s.i.). As is shown in FIGURE 6, the concave surface, 37, may have a diameter exceeding that of the opposite flat diaphragm surface, for purposes of developing the desired strain pattern. Strain gages are applied to the concave diaphragm surface, and this surface is oriented such that corrosive fluids which are under pressure measurement will not reach the gages and their wiring; however the surface orientation may be reversed, or the gages may be applied to the flat surface, where a corrosive environment is not expected or where suitable protection is provided. Because the improved transducer diaphragms have central deflections which are also linearly related to the pressures being investigated, these deflections may in some designs be taken as a direct measure of the pressure. It is contemplated that differentials of pressures applied to different sides of the diaphragm may of course be measured in the same manner taught with reference to pressures applied only to one side of a diaphragm.

The specific practices and preferred embodiments herein referred to have been offered by way of disclosure rather than limitation, and it should be understood that various modifications, additions and substitutions may be effected by those skilled in the art without departure from these teachings; it is therefore aimed in the appended claims to embrace all such variations as fall within the true spirit and scope of this invention.

What we claim as new and desire to secure by Letters Patent of the United States is:

1. A gaged diaphragm transducer comprising an elastic diaphragm having oppositely-disposed surfaces at least one of which has a concave curvature and wherein the thicknesses of the diaphragm increase progressively from substantially the middle to the outer periphery thereof, means supporting said diaphragm about the outer periphery thereof, means for deflecting said diaphragm relative to said supporting means, and measurement means including strain gages connected to said one of said diaphragm surfaces having said concave curvature and developing electrical output signals responsive to deflections near the center and outer periphery thereof, respectively said thicknesses of said diaphragm at the middle and outer periphery thereof being of relative proportions making the maximum co-existing radial strains in tension and compression on each surface of the deflected diaphragm substantially equal.

2. A gaged diaphragm transducer comprising an impervious elastic diaphragm having oppositely-disposed surfaces at least one of which has a continuous concave curvature and wherein the thicknesses of the diaphragm increase progressively from substantially the middle to the outer periphery thereof, means supporting said diaphragm about the outer periphery thereof, means applying fluid pressure to the surfaces of said diaphragm opposite said one of said surfaces for deflecting said diaphragm relative to said supporting means, measurement means in the form of electrical strain gages connected to at least said one of said surfaces of said diaphragm and developing electrical output signals responsive to pressure-induced strains near the center and outer periphery of at least said one of said surfaces of the deflected diaphragm, said thicknesses of said diaphragm at the middle and outer periphery thereof being of relative proportions making the maximum co-existing radial strains in tension and compression on said one of said surfaces of the deflected diaphragm substantially equal and making the gradient of radial strain near the periphery of the diaphragm relatively low.

3. A gaged diaphragm transducer as set forth in claim 2 wherein said diaphragm is formed of metal and is substantially circular, wherein the other of said surfaces is substantially flat, and wherein said measurement means includes at least two electrical resistance strain gages one of which is connected to said one of said surfaces of the diaphragm near the middle thereof and the other of which is connected to said one of said surfaces of the diaphragm near the outer periphery thereof, whereby the output signals from said resistance strain gages are substantially linearly related to the fluid pressures applied to said diaphragm.

4. A gaged diaphragm pressure transducer comprising a substantially circular elastic metal diaphragm having oppositely-disposed co-extensive surfaces one of which is normally substantially flat and the other of which has a substantially spherical concave contour, the thickness of the diaphragm between said surfaces being symmetrically distributed about the center thereof and increasing progressively from the center of the outer periphery thereof, integral rim means supporting said diaphragm about the outer periphery thereof, means applying fluid pressures to the substantially flat surface of said diaphragm for deflecting said diaphragm relative to said integral rim means, measurement means in the form of at least two electrical strain gages each connected to the concave surface of the diaphragm at different radial positions which are respectively near the center and near the outer periphery of said diaphragm, the radius of curvature of said concave contour being of a magnitude in relation to the thickness at the center of said diaphragm making the maximum co-existing radial surface strains of said diaphragm in tension near said center of said concave surface and in compression near said outer periphery of said concave surface substantially equal and making the gradient of radical strain near said outer periphery relatively low.

5. A gaged diaphragm pressure transducer as set forth in claim 4 wherein the diameter of said diaphragm is of the order of about one inch and the ratio between said radius of curvature and said thickness at the center of said diaphragm is between about 100 and 600.

6. A gaged diaphragm pressure transducer as set forth in claim 4 wherein said other of said surfaces having said substantially spherical concave contour has a diameter at least as large as the diameter of said one of said surfaces which is normally substantially flat.

7. A gaged diaphragm pressure transducer as set forth in claim 4 wherein said rim is of substantially hollow cylindrical form with said integral diaphgram closing one end thereof, wherein said concave surface is a machined surface exposed outwardly of the closed end of said rim, and wherein said radius of curvature is at least about one hundred times the thickness of the center of said diaphragm and extends from a point aligned with a line normal to the flat surface of the diaphragm at said center.

References Cited by the Examiner
UNITED STATES PATENTS

| | | | |
|---|---|---|---|
| 2,360,886 | 10/1944 | Osterberg | 338—4 X |
| 3,122,717 | 2/1964 | Motsinger | 338—4 |
| 3,128,628 | 4/1964 | Lebow | 73—398 |
| 3,130,382 | 4/1964 | Laimins | 338—5 |
| 3,168,718 | 2/1965 | Swartz et al. | 338—4 X |
| 3,204,463 | 9/1965 | Taber | 73—398 |
| 3,213,400 | 10/1965 | Gieb | 338—4 |

FOREIGN PATENTS

| | | |
|---|---|---|
| 921,837 | 3/1963 | Great Britain. |
| 922,982 | 4/1963 | Great Britain. |

RICHARD M. WOOD, *Primary Examiner.*

W. D. BROOKS, *Assistant Examiner.*